Figures 1, 2, 3:
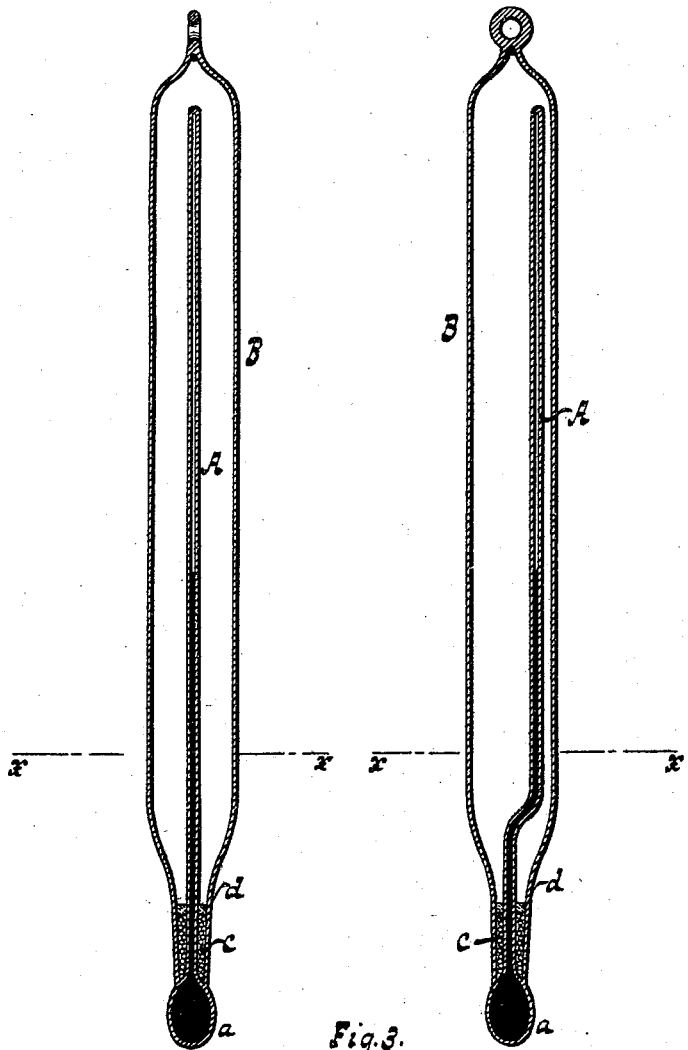

(No Model.)

C. J. TAGLIABUE.
THERMOMETER.

No. 493,197. Patented Mar. 7, 1893.

WITNESSES:
William J. Miller
Edward Wolff.

INVENTOR:
Charles J. Tagliabue.
BY
Van Santvoord & Hauff
ATTORNEYS

UNITED STATES PATENT OFFICE.

CHARLES J. TAGLIABUE, OF BROOKLYN, NEW YORK.

THERMOMETER.

SPECIFICATION forming part of Letters Patent No. 493,197, dated March 7, 1893.

Application filed October 25, 1892. Serial No. 449,928. (No model.)

*To all whom it may concern:*

Be it known that I, CHARLES J. TAGLIABUE, a citizen of the United States, residing at Brooklyn, in the county of Kings and State of New York, have invented new and useful Improvements in Thermometers, of which the following is a specification.

This invention relates to a thermometer which can be readily used for ascertaining the temperature of liquids as set forth in the following specification and claims and illustrated in the annexed drawings in which Figure 1, is a transverse section of a thermometer containing my invention. Fig. 2, is a section at right angles to the section Fig. 1. Fig. 3, is a section along $x$ $x$ Fig. 2.

The thermometer has its tube or stem A and bulb $a$ arranged in the usual way. An envelope B of glass is melted or fused to the bulb. A ballast weight $c$ such as a supply of shot is placed immediately above the bulb and is held in place by a stopper $d$ readily formed by dropping melted wax onto the weight $c$ and allowing the wax to harden. The bulb $a$ and the envelope or float B support the ballast weight $c$, which latter is independent of and separated from the contents of the bulb $a$, and this ballast weight is stationary as regards the tube or stem A and the envelope or float B, whereby the ballast weight remains invariable and the instrument is properly sustained in an upright position even though most of the contents of the bulb rise in the tube or stem A.

When the thermometer is placed in a liquid such as milk the envelope B acts as a float to sustain the thermometer in an upright position, so that the temperature which is indicated can be readily noted.

As the weight $c$ is above the bulb the latter is exposed to free contact with the liquid so that the temperature will be speedily indicated.

What I claim as new, and desire to secure by Letters Patent, is—

1. The combination with a thermometer having a bulb $a$ of an envelope or float melted or fused to the bulb, a ballast weight independent of the contents of the bulb and secured immediately above the latter and a stopper for holding the ballast in place, substantially as described.

2. The combination with a thermometer and its bulb of a float secured to the thermometer and a ballast weight independent of the contents of the bulb and secured in proximity thereto, substantially as described.

In testimony whereof I have hereunto set my hand in the presence of two subscribing witnesses.

CH. J. TAGLIABUE.

Witnesses:
J. W. NASSAUER,
E. F. KASTENHUBER.